US006886228B1

(12) United States Patent
Chen

(10) Patent No.: US 6,886,228 B1
(45) Date of Patent: May 3, 2005

(54) BEARINGS OR SLEEVES INSTALLING DEVICE

(76) Inventor: Teng-Fu Chen, No. 266, FuLu Street, Shalu Town, Taichung County (TW)

( * ) Notice: Subject to any disclaimer, the term of this patent is extended or adjusted under 35 U.S.C. 154(b) by 18 days.

(21) Appl. No.: 10/797,089

(22) Filed: Mar. 11, 2004

(51) Int. Cl.[7] .................................................. B23P 19/04
(52) U.S. Cl. ............................ 29/263; 29/255; 29/278
(58) Field of Search .......................... 29/263, 255, 259, 29/278, 256

(56) References Cited

U.S. PATENT DOCUMENTS 4,059,883 A * 11/1977 Osborne ...................... 29/259
4,299,020 A * 11/1981 Grego, Jr. .................... 29/259
4,984,345 A * 1/1991 Sawada et al. ............... 29/263
5,408,732 A * 4/1995 Anfuso ........................ 29/263
5,727,298 A * 3/1998 Strong ......................... 29/259
5,894,650 A * 4/1999 Barenburg ................... 29/259
6,415,491 B1 * 7/2002 Klann ......................... 29/259

* cited by examiner

*Primary Examiner*—Lee D. Wilson

(57) ABSTRACT

A bearing or sleeve installing device includes a bar and a first bolt and two second bolts threadedly extend through the bar. A carrying member with a bearing or a sleeve mounted thereto. The carrying member has a threaded hole and the first bolt extends through a hole in an object and is threadedly connected to the threaded hole in the carrying member. The bar contacts the object, the carrying member moves into the hole in the object when rotating the first bolt so as to install the bearing or sleeve in the hole of the object.

3 Claims, 9 Drawing Sheets

BEARINGS OR SLEEVES INSTALLING DEVICE

FIELD OF THE INVENTION

The present invention relates to an installing device for installing a bearing or a sleeve in a hole without need of hammering the bearing or the sleeve.

BACKGROUND OF THE INVENTION

A conventional way to install a bearing or a sleeve in a hole is to hammer the bearing for example into the hole. During the hammering, the bearing has to be hammered evenly at different positions so that the bearing moves and fits into the hole as desired. Nevertheless, it requires a certain level of skill to hammer the bearing and the bearing often tilts and is stocked in the hole. This could damage the inner periphery of the hole and/or damage the bearing. When installing the sleeve in a hole, the sleeve could be deformed due to the hammering if the sleeve has a thin wall.

The present invention intends to provide an installing device that employs threading movement to install a bearing or sleeve into a hole.

SUMMARY OF THE INVENTION

The present invention relates to a bearing or sleeve installing device and comprises a bar having a first threaded hole and two second threaded holes. A first bolt movably extends through the first threaded hole and two second bolts are threaded engaged with the second threaded holes. A carrying member has a first section and a second section which is co-axially connected to the first section. A diameter of the second section is larger than that of the first section on which the sleeve is mounted and stopped at a stepped shoulder defined radially at a conjunction of the first section and the second section. A third threaded hole is defined in an end surface of the first section. The carrying member and the bar are located on opposite sides of an object having a hole in which the sleeve is to be fitted. The first bolt extends through the hole in the object and threadedly engaged with the third threaded hole. The carrying member moves into the hole of the object when rotating the first bolt.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
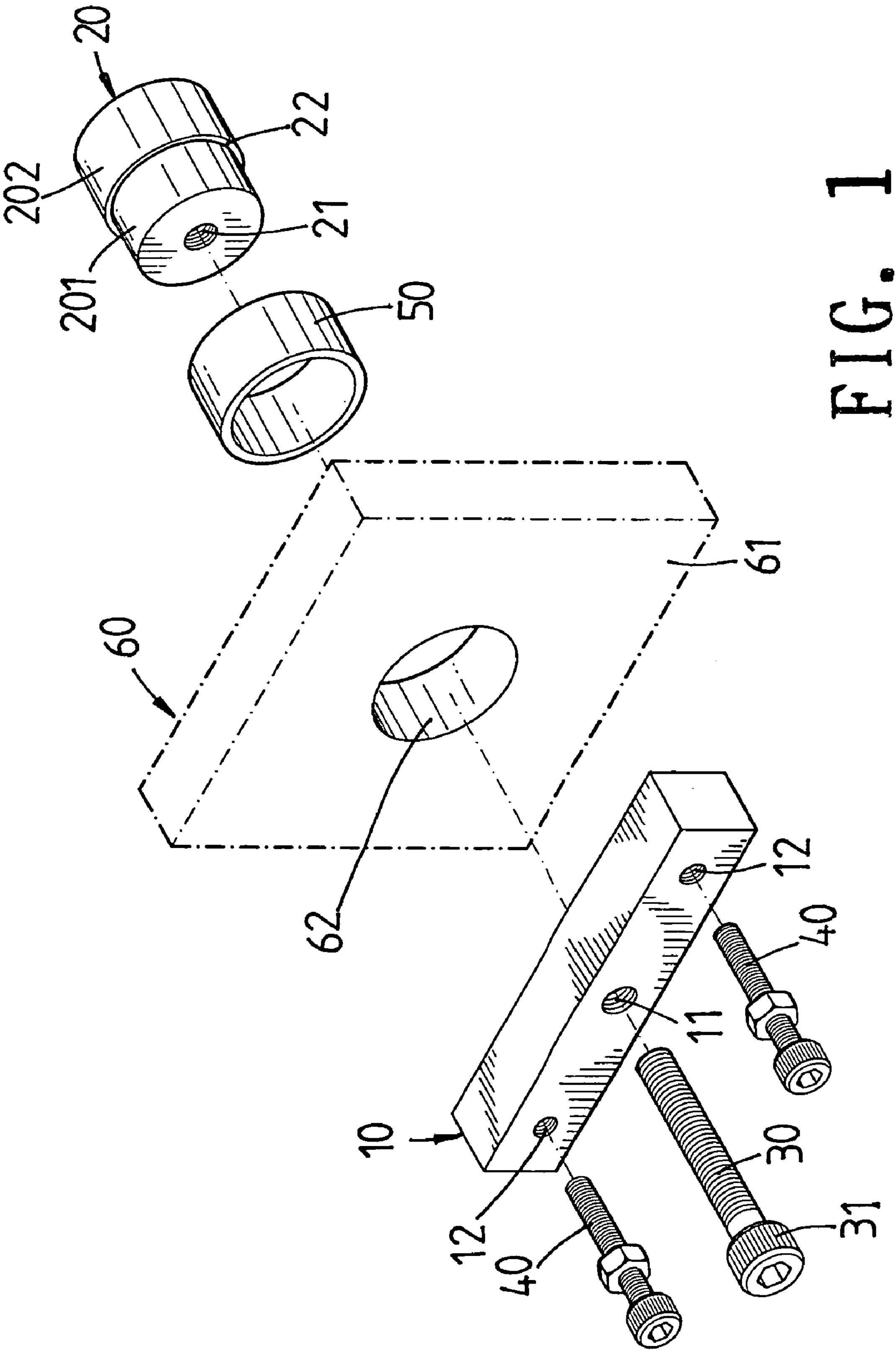
FIG. 1 is an exploded view to show the installing device of the present invention.
Figure 2:
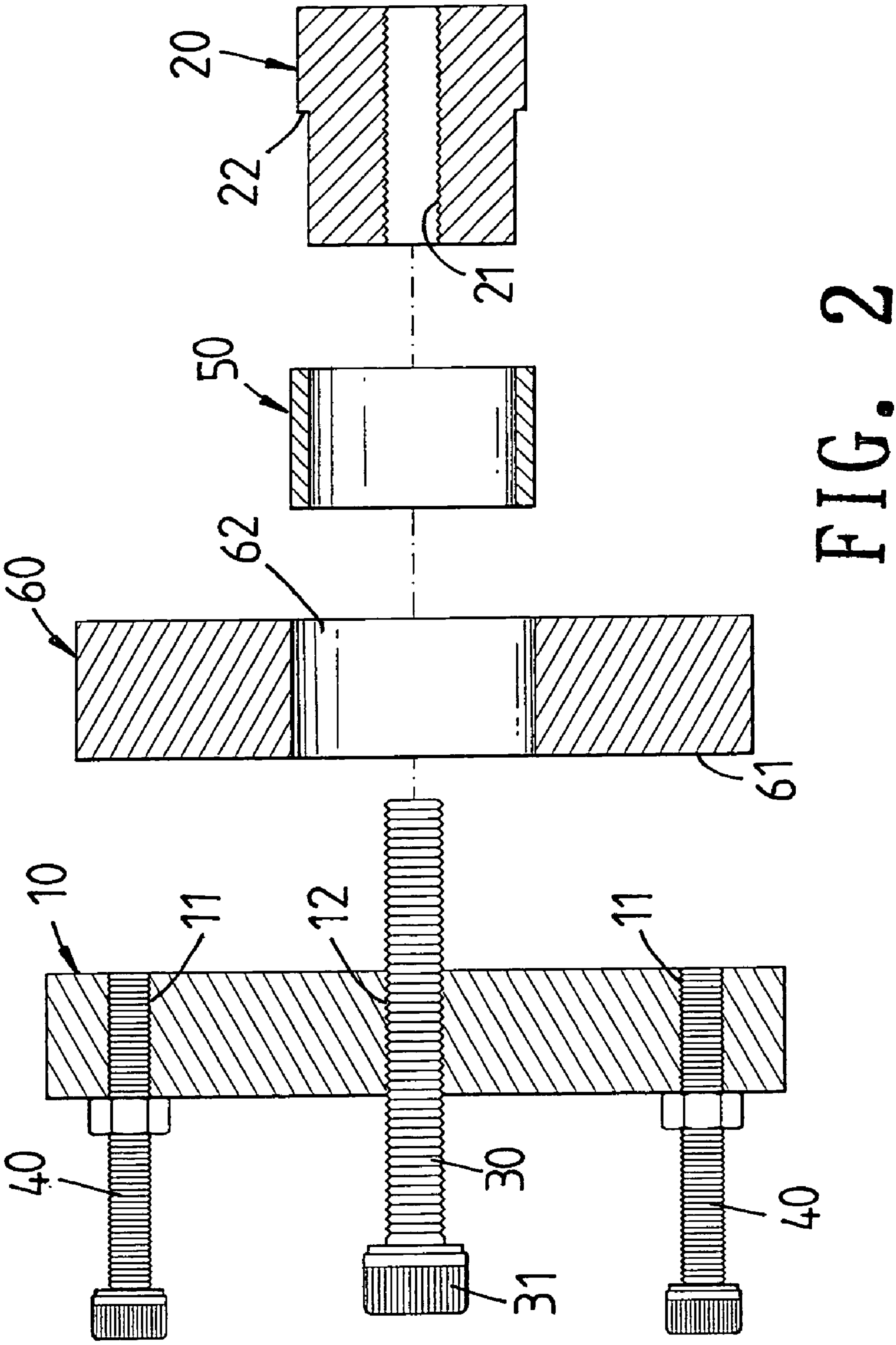
FIG. 2 is a side cross sectional view to show the installing device of the present invention.
Figure 3:
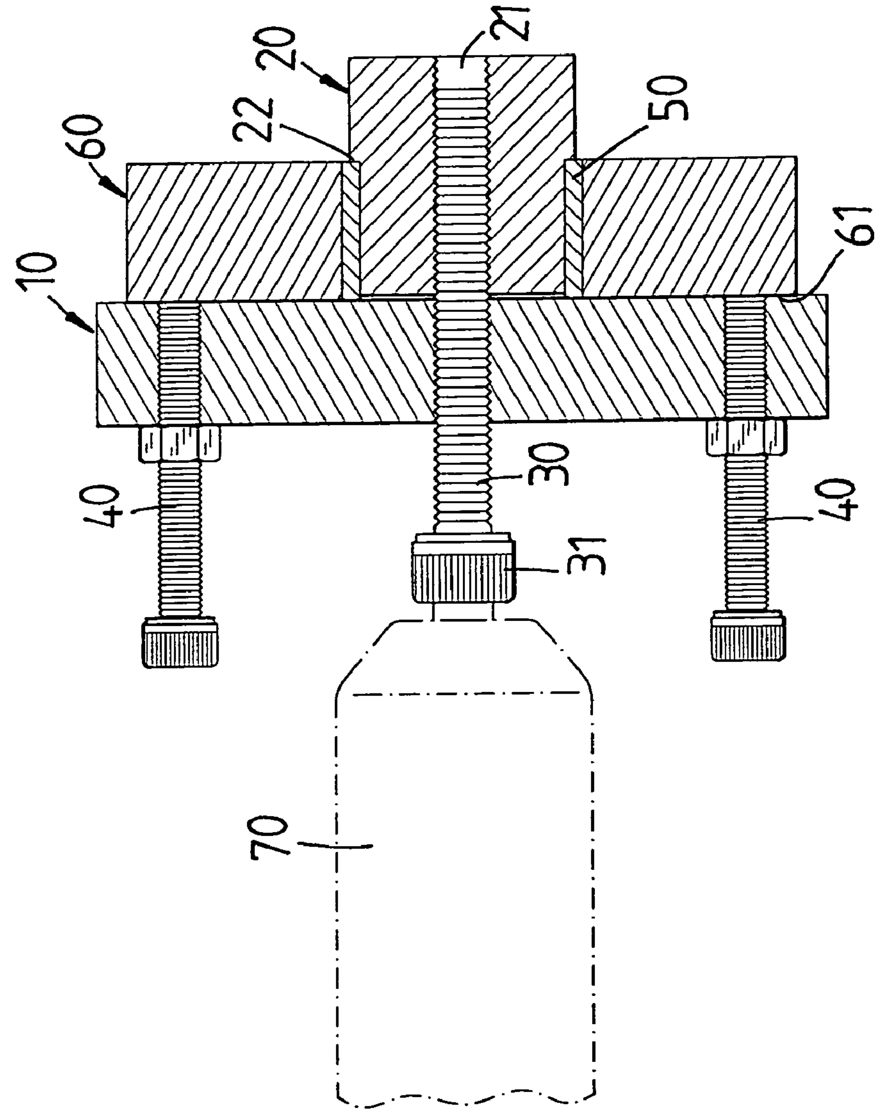
FIG. 3 is a side cross sectional view to show the carrying member with the sleeve are inserted in the hole of the object when rotating the first bolt.
Figure 4:
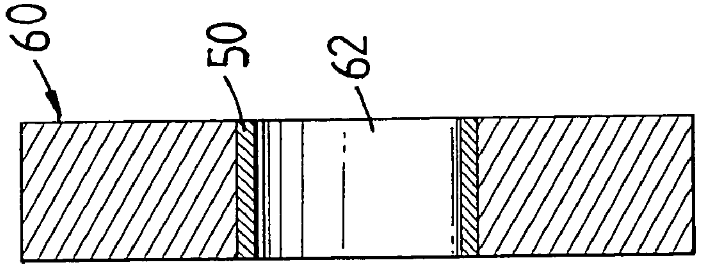
FIG. 4 shows the sleeve is inserted in the hole of the object.
Figure 5:
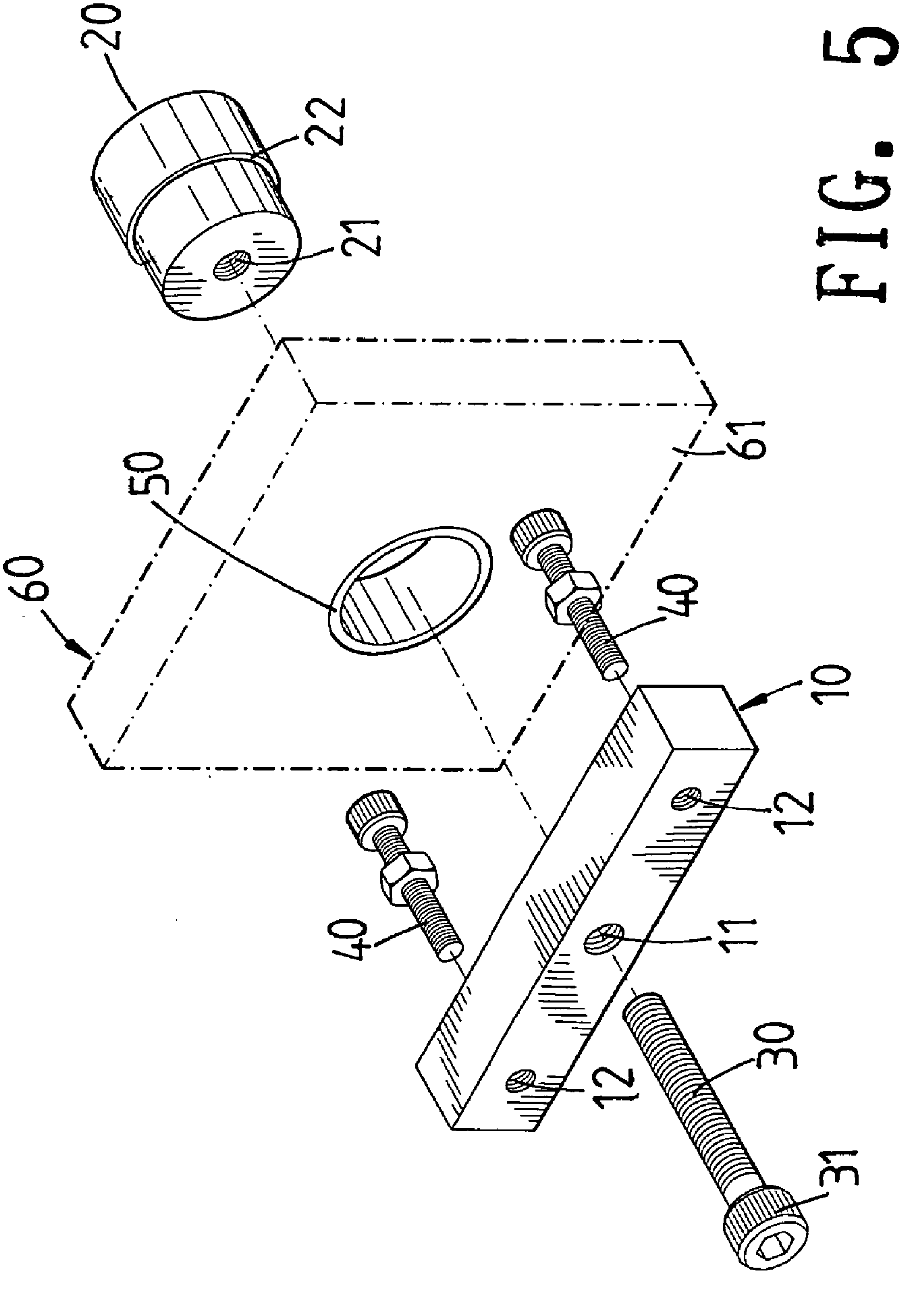
FIG. 5 is an exploded view to show the installing device of the present invention, wherein the sleeve is to be removed from the hole of the object.
Figure 6:
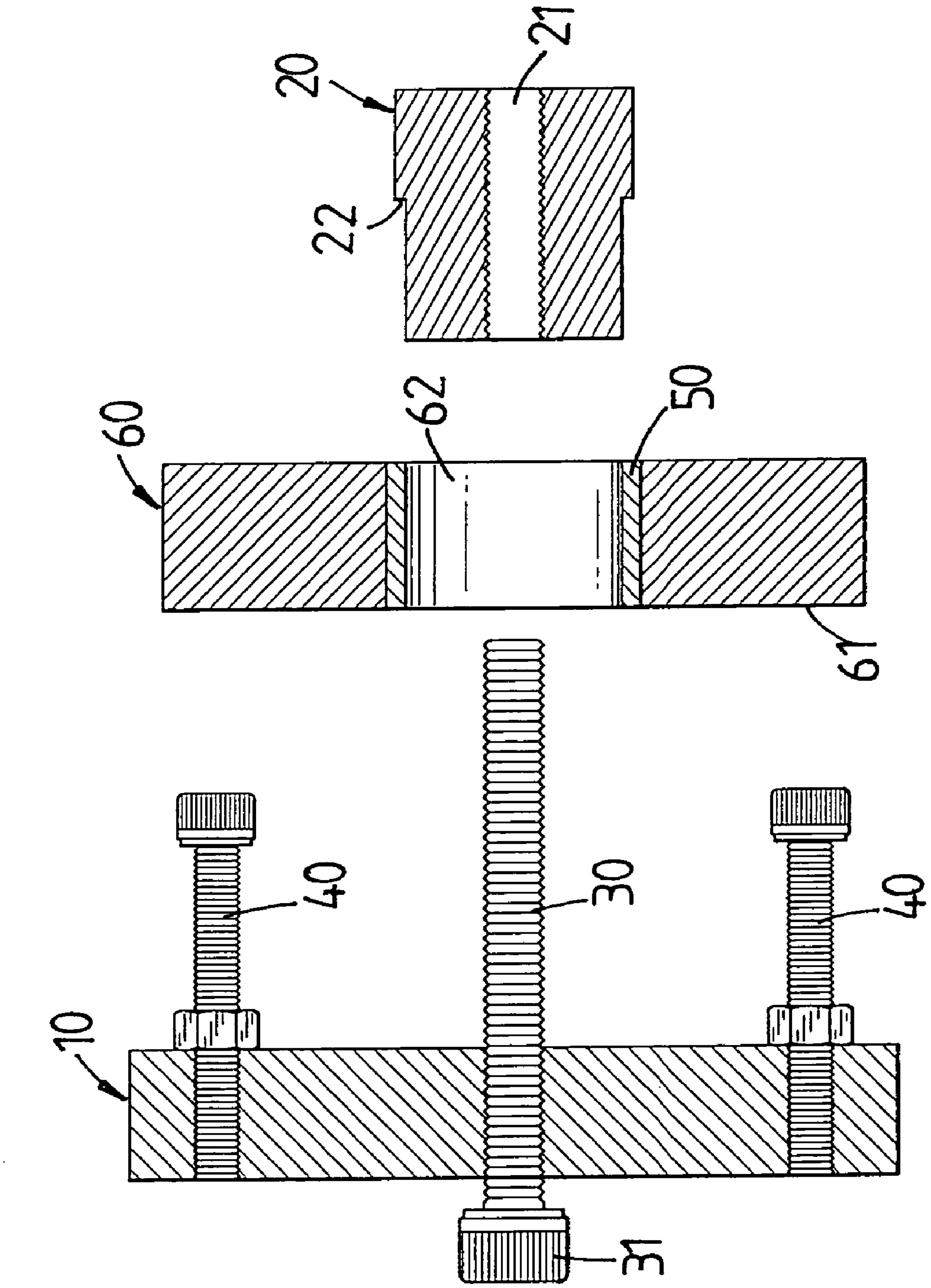
FIG. 6 is a side cross sectional view to show the installing device of the present invention as shown in FIG. 5.
Figure 7:
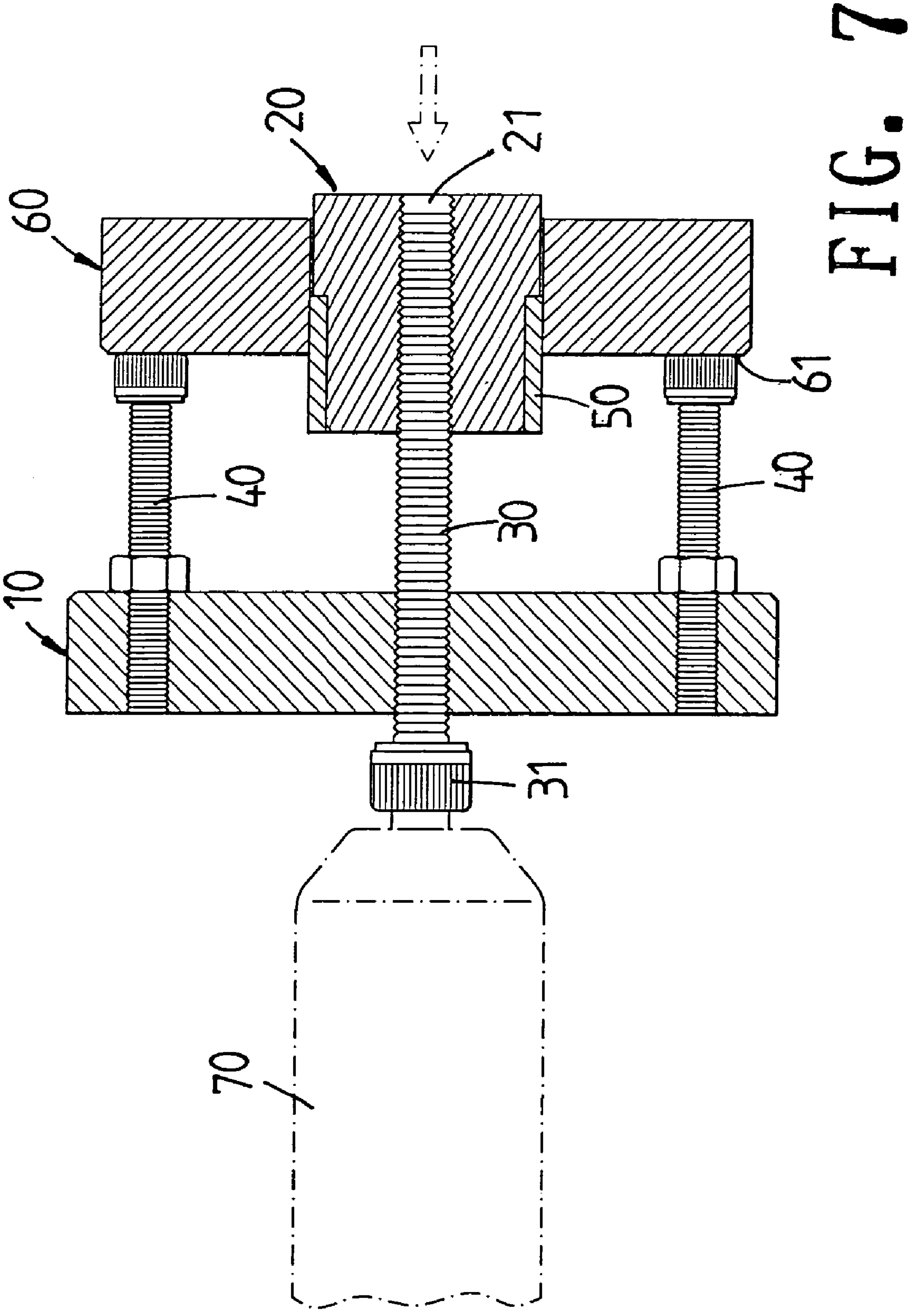
FIG. 7 shows the sleeve is removing from the hole of the object.
Figure 8:
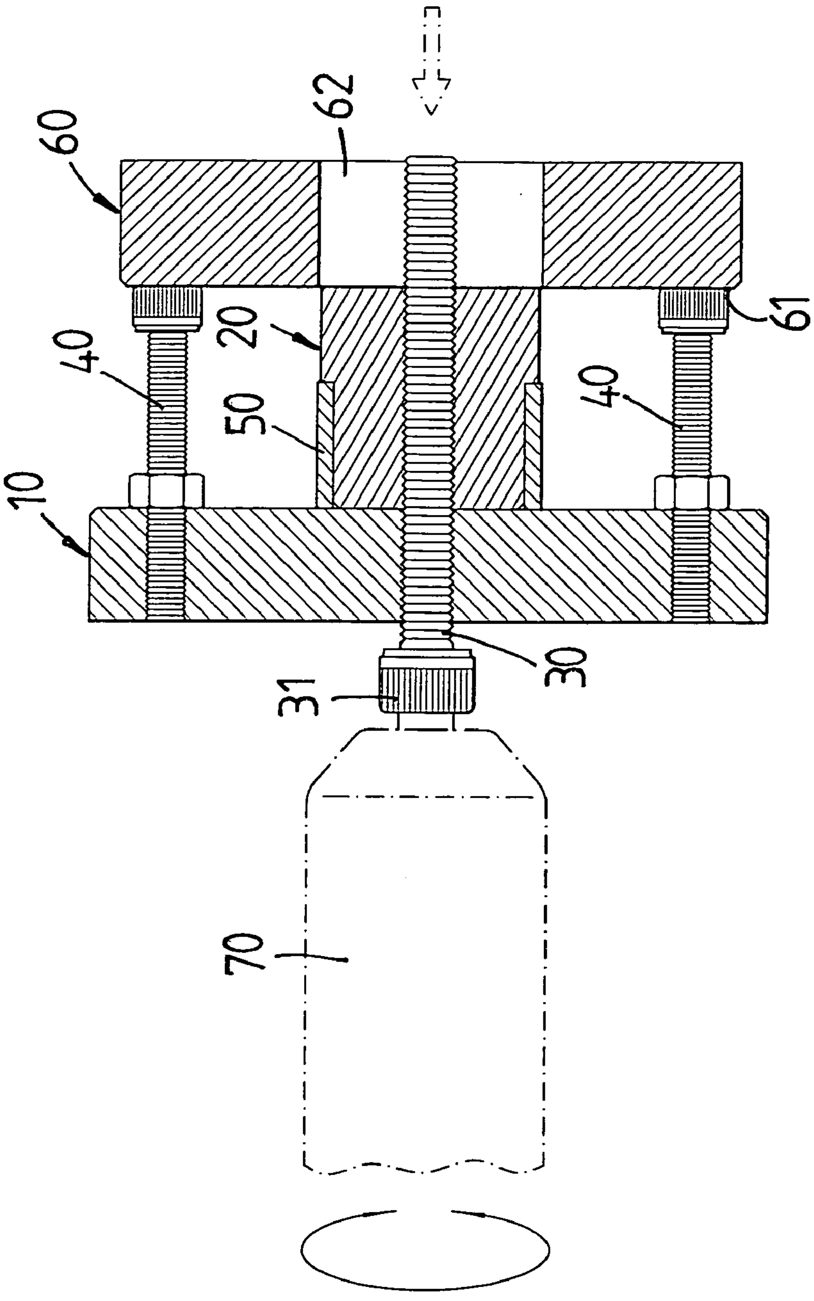
FIG. 8 shows the sleeve is removed from the hole of the object.
Figure 9:
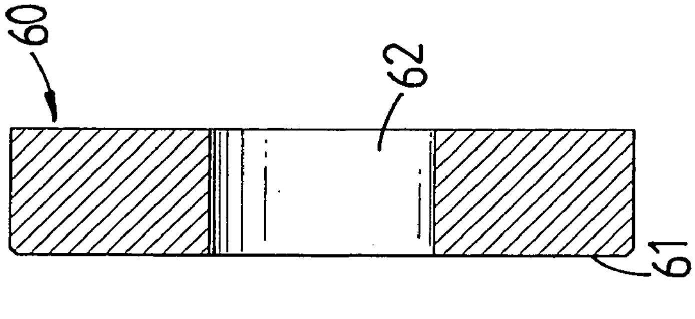
FIG. 9 shows the sleeve is removed from the hole in the object.

Referring to FIGS. 1 to 3, the installing device of the present invention comprises a bar 10 which has a first threaded hole 11 and two second threaded holes 12, the first threaded hole 11 located between the two second threaded holes 12. A first bolt 30 movably extends through the first threaded hole 11 and is in alignment with a hole 62 in an object 60 to be fitted with a bearing or sleeve 50. Two second bolts 40 are threaded engaged nut mounted thereto so as to position the second bolts 40 at desired positions relative to the bar 10.

A carrying member 20 has a first section 201 and a second section 202 which is co-axially connected to the first section 201. A diameter of the second section 202 is larger than that of the first section 201 so as to form a stepped shoulder 22 defined radially at a conjunction of the first section 201 and the second section 202. A third threaded hole 21 is defined in an end surface of the first section 201. The carrying member 20 and the bar 10 are located on opposite sides of the object 60. Further referring to FIG. 3, the first bolt 30 and the two second bolts 40 access to the bar 10 from a first side of the bar 10. The two nuts on the two second bolts 40 are in contact with the first side of the bar 10 so as to position the second bolts 40 such that a second side of the bar 10 contacts a front side 61 of the object 60. The first and the second sides of the bar 10 are opposite from each other. The first bolt 30 extends through the hole 62 and is threadedly connected to the third threaded hole 21. The head 31 of the first bolt 30 is then connected to a tool which rotates the first bolt 30. The carrying member 20 is then moved on the first bolt 30 and inserted in the hole 62 to fit the sleeve 50 with the hole 62. The sleeve 50 is sized to be just fitted in the hole 62 so that when rotating the first bolt 30 in opposite direction, the carrying member is removed from the sleeve 50 which is then fitted in the hole 62.

Referring to FIGS. 5 to 9, when removing the sleeve 50 from the side of the bar 10 and the two second bolts 40 access the bar 10 from the second side of the bar 10. The two second bolts 40 each have a head which contacts at the front side 61 of the object 60, and the two nuts on the two second bolts 40 contact the second side of the bar 10, such that a distance between the bar 10 and the object 60 is the same or longer than a length of the carrying member 20. When rotating the first bolt 30 by the tool in opposite direction, the carrying member 20 goes through the hole 62 and the sleeve 50 is pushed out from the hole 62.

Figure 10:
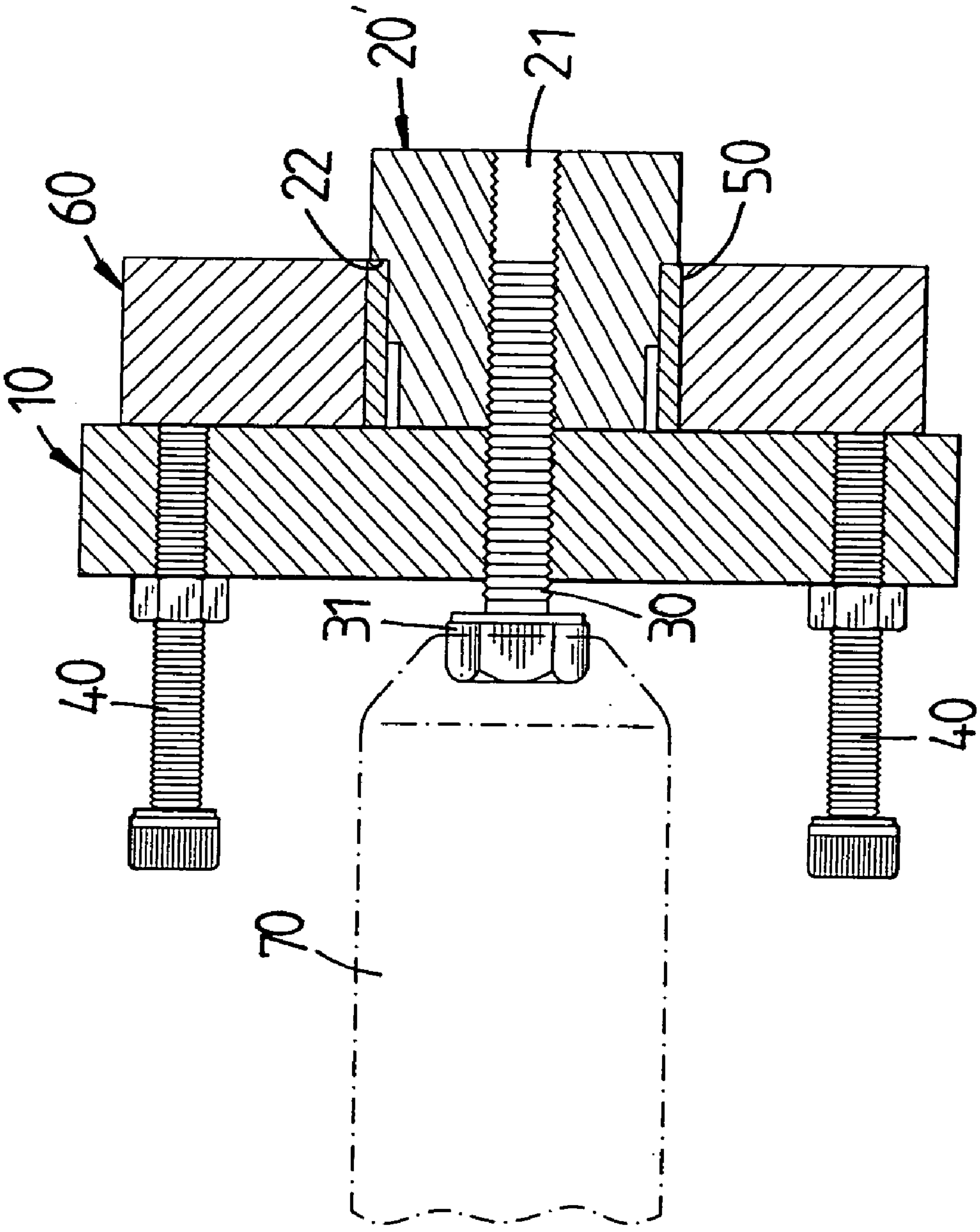
FIG. 10 shows the carrying member includes two sections of different diameters, and a sleeve is mounted to the carrying member which is inserted in the hole of the object.
Figure 11:
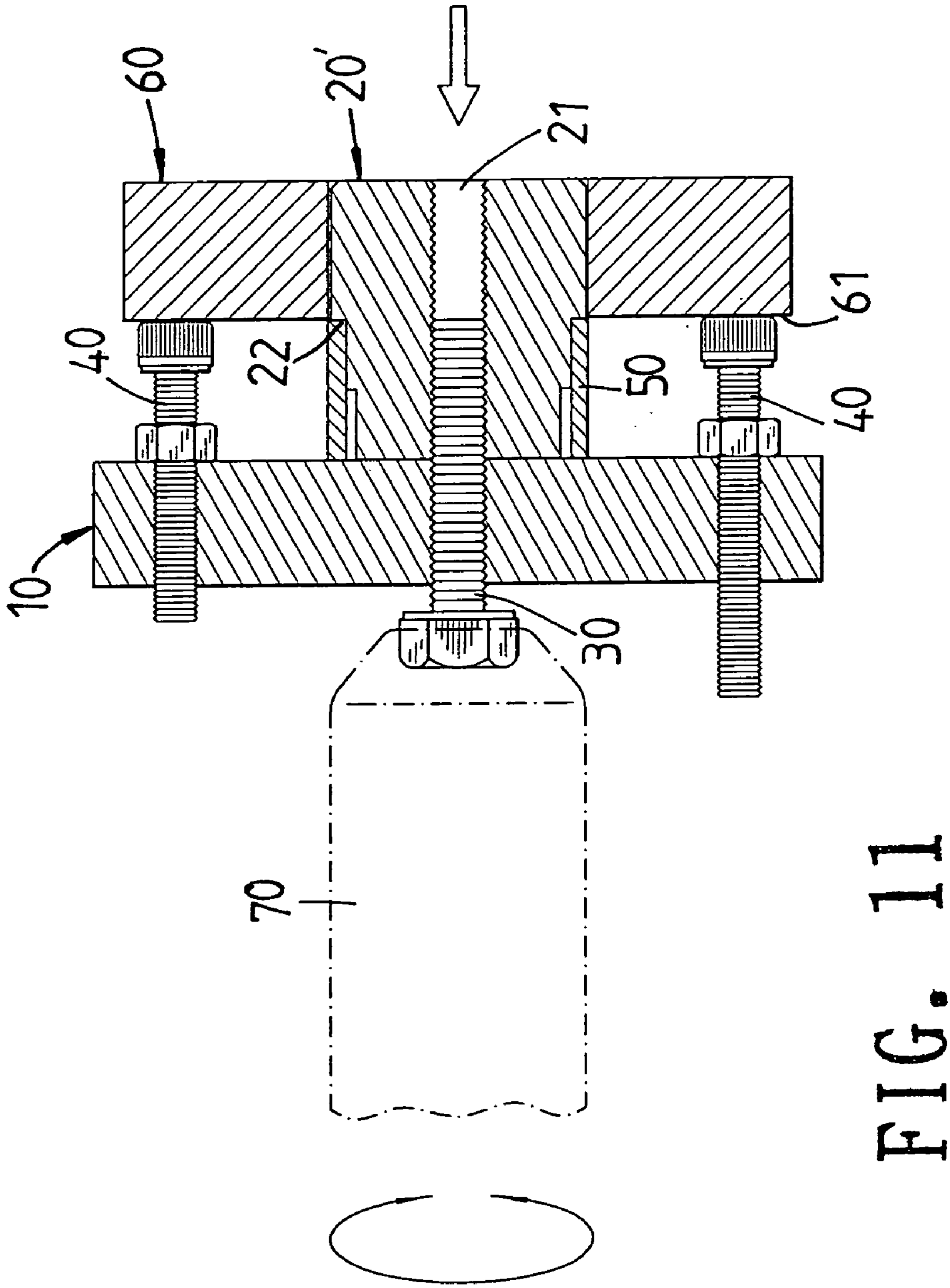
FIG. 11 shows the carrying member includes two sections of different diameters, and a sleeve is mounted to the carrying member which is removed from the hole of the object.

FIGS. 10 and 11 show that the carrying member 20' may have three sections of different diameters such that sleeves 50 of different inner diameters can be inserted into or removed from the hole 62 of the object by the installing device of the present invention.

While we have shown and described the embodiment in accordance with the present invention, it should be clear to those skilled in the art that further embodiments may be made without departing from the scope of the present invention.

What is claimed is:

1. An installing device comprising:

a bar having a first threaded hole and two second threaded holes, the first threaded hole located between the two second threaded holes;

a first bolt movably extends through the first threaded hole and adapted to be in alignment with a hole in an object to be fitted with a bearing or sleeve, two second bolts threadedly engaged with the second threaded holes, and a carrying member having a first section and a second section which is co-axially connected to the first section, a diameter of the second section being larger than that of the first section, a stepped shoulder defined radially at a conjunction of the first section and the second section, a third threaded hole defined in an end surface of the first section, the carrying member and the bar being adapted to be located on opposite sides of the object having the hole, the first bolt adapted to extend through the hole in the object and threadedly engaged with the third threaded hole.

2. The device as claimed in claim 1, wherein the first bolt and the two second bolts access to the bar from a first side of the bar, a second side of the bar adapted to contact a front side of the object.

3. The device as claimed in claim 1, wherein the first bolt, accesses the bar from a first side of the bar and the two second bolts access the bar from a second side of the bar, the first and the second sides being opposite from each other, the two second bolts each having a head which is adapted to contact at a front side of the object, the two nuts on the two second bolts contacting a second side of the bar.

* * * * *